Dec. 25, 1934.  E. A. JOHNSTON  1,985,373
RECEPTACLE FOR HARVESTERS
Filed Nov. 17, 1933  3 Sheets-Sheet 1
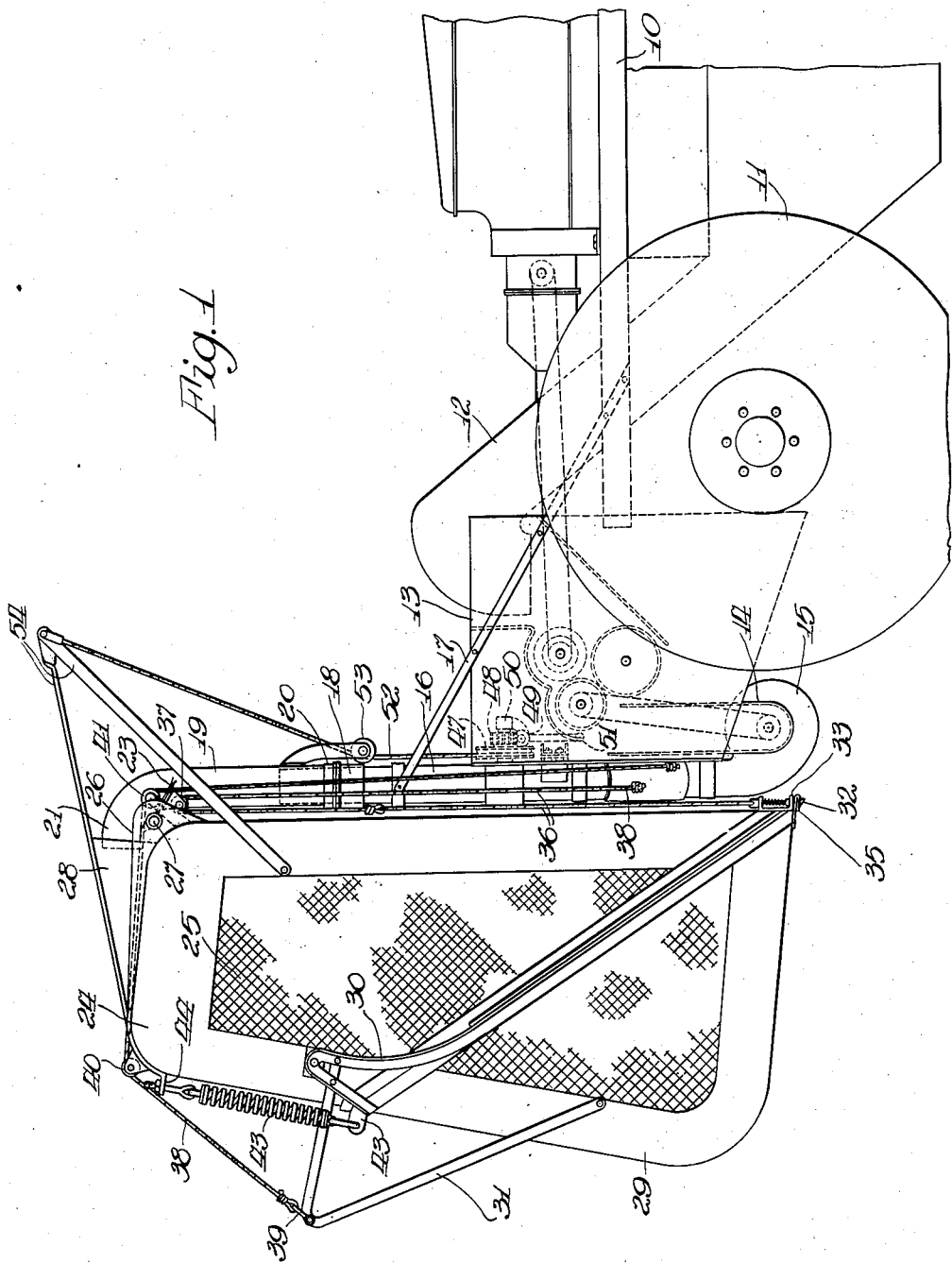

Dec. 25, 1934.     E. A. JOHNSTON     1,985,373
RECEPTACLE FOR HARVESTERS
Filed Nov. 17, 1933     3 Sheets-Sheet 2
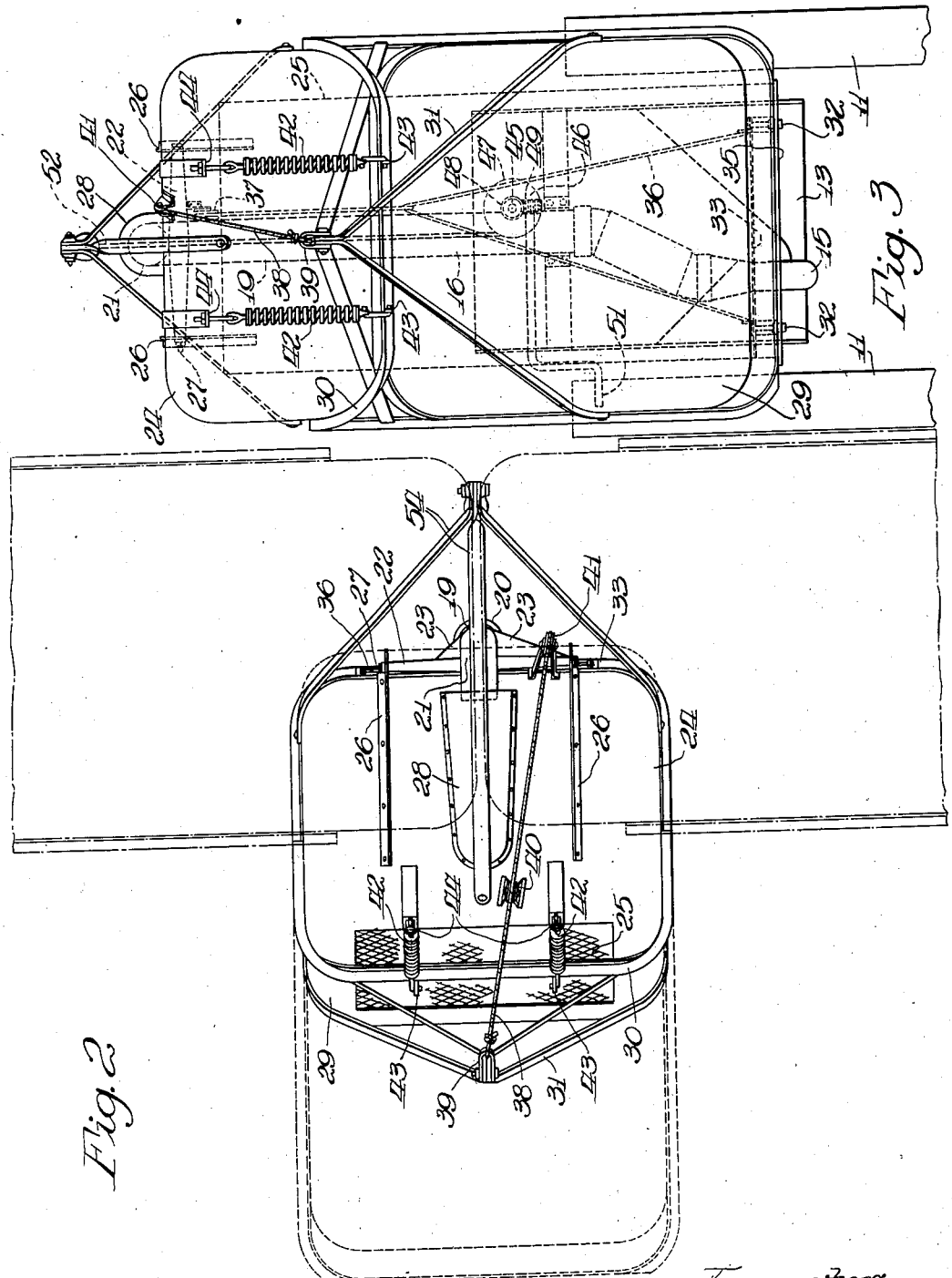

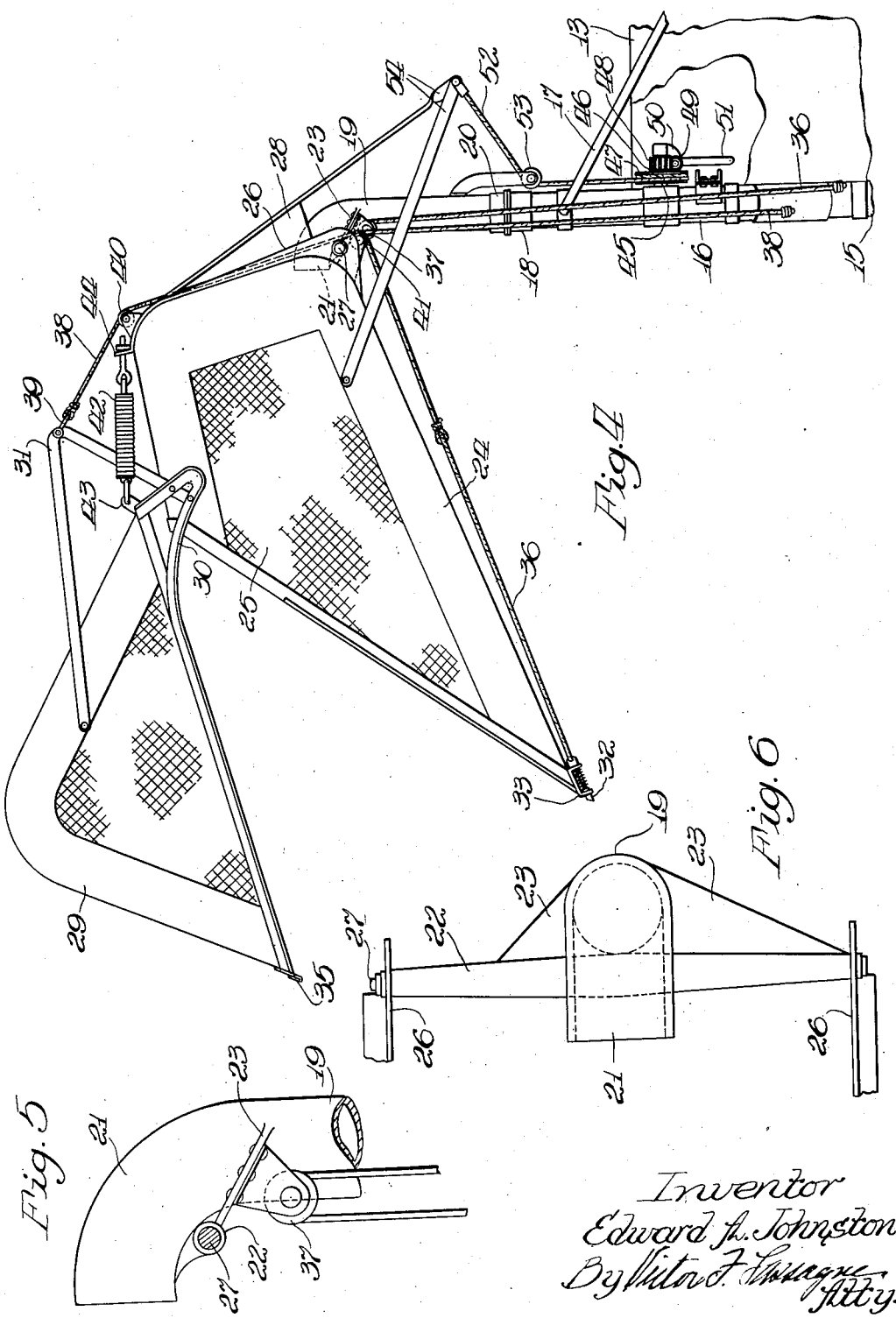

Patented Dec. 25, 1934

1,985,373

UNITED STATES PATENT OFFICE 1,985,373

RECEPTACLE FOR HARVESTERS

Edward A. Johnston, Chicago, Ill., assignor to International Harvester Company, a corporation of New Jersey Application November 17, 1933, Serial No. 698,445

16 Claims. (Cl. 214—65)

This invention relates to receptacles for harvesting machines. More specifically it relates to a swinging and tilting receptacle for cotton picking machines.

In the harvesting of crops by tractor mounted and operated machines, one of the problems is the storage of the crop harvested until it can be dumped or transferred to some other receptacle. The rate at which tractor operated harvesters gather the crop is such that under most conditions a comparatively large receptacle is required even with frequent emptying of the receptacle. In the harvesting of cotton, this problem is particularly acute, as cotton is very bulky and is not readily transferred from one receptacle or container to another. It is particularly to provide satisfactory means for handling cotton from a harvester that the receptacle of the present invention was designed.

The principal object of the present invention is to provide a large capacity receiving tank or receptacle for harvesters mounted and supported on the harvester in such a manner that it may be lifted to a substantial height and swung into position to deliver into a tank, wagon, or other auxiliary receiving means.

Other objects and the particular construction illustrated by which they are attained will be apparent from the detailed description to follow.

In the drawings:

Figure 1 is a side elevation of the rear portion of a cotton harvesting machine on which a receptacle embodying the invention is mounted;

Figure 2 is a plan view of the receptacle in lifted position, dotted lines showing the two streams in each direction to which the receptacle may be swung for discharging the material contained therein;

Figure 3 is a rear elevation of the machine shown in Figure 1;

Figure 4 is a side elevation showing the receptacle lifted with the cover in raised position;

Figure 5 is an enlarged detail showing the mounting bracket for the receptacle on its supporting standard; and, Figure 6 is an enlarged top plan view of the supporting bracket for the tank, showing also the discharge of the material handling means.

In the drawings a self-propelled cotton picker 10 mounted on wheels 11 is shown in outline to illustrate the function of the receptacle and means by which it may be mounted on a harvesting machine. A cotton picker on which a receptacle of this type may be satisfactorily mounted is shown in the United States Patent No. 1,846,467.

Cotton gathered by the machine is conveyed up the elevators 12 and delivered into a cleaner mounted in a rear frame structure 13 rigidly secured to the machine. Dotted lines indicate cleaner elements mounted within the frame structure 13.

The cleaned cotton is delivered into a chute 14, which delivers into the intake of a blower fan 15 mounted at the bottom of the frame structure 13. A hollow standard 16 formed from a large diameter pipe connects with the outlet from the fan 15. Said standard is rigidly secured to the frame structure 13 by several securing means including forwardly and downwardly extending braces 17 secured to a collar on the standard 16. Near the upper end of the standard 16, an abutting collar 18 is rigidly secured.

An upper hollow standard 19 formed from a pipe of larger diameter than the pipe 16 is rotatably mounted over the end of the pipe 16 and is provided with an abutting flange 20 which seats on the abutment 18. By this construction it will be understood that the upper standard 19 is free to pivot about a vertical axis with respect to the standard 16.

At the upper end of standard 19, a discharging elbow 21 extends rearwardly. At the base of said elbow a transversely extending sleeve 22 secured by webs 23 to the standard forms a pivot axis for the receptacle 24. The receptacle 24 is formed of sheet metal butt-welded at the joints; to form a one-piece construction. Along the sides, wire netting 25 is substituted for the sheet metal. This lightens the construction and permits inspection of the contents within the receptacle. As illustrated, the receptacle hangs substantially vertically downwardly. It is supported in that position during the operation of the harvester by spaced attaching brackets 26 which are pivotally secured to the sleeve 22 by a rod 27 extending through openings in the brackets and through the sleeve.

Above the brackets 26, an extension 28 is formed at the upper end of the casing, into which the elbow 21 extends. The extension 28 is so formed that it does not engage the elbow during pivoting about the supporting pin 27.

The cover 29, which includes a portion of the receptacle 24, completes the lower end of the receptacle by forming substantially half of the rear wall and all of the bottom wall. Said cover is provided with attaching brackets 30 which are pivotally connected to the receptacle upwardly of the rear wall of the receptacle. To provide lifting means for the cover, an outwardly extending lifting structure 31 is rigidly secured to the cover. This structure provides a long lever arm about the axis of attachment of the cover with the receptacle.

At the forward side wall of the casing adjacent the bottom, a latch 32 slidably mounted in a bracket 33 attached to the main portion of the receptacle or casing is positioned to engage a latch member 35 mounted on the bottom wall of the cover. A spring normally holds the latch in engaged position. An actuating rope or cable 36 connected to the latch extends upwardly and over a pulley 37 mounted on the upper standard 19 and therefrom downwardly into a position to be reached by an operator.

For lifting the cover 29, a cable or rope 38 is secured by a clevis 39 to the lifting structure 31. The cable 38 extends over a guide pulley 40 mounted on the upper rear corner of the receptacle and over a guide pulley 41 mounted on the elbow 21 of the upper supporting standard 19. From the pulley 41 the cable extends downwardly where it may be reached by an operator for lifting the cover. To assist in lifting the cover when the receptacle is in lifted position, a pair of heavy tension springs 42 are secured in spaced positions to brackets 43 on the cover and brackets 44 on the receptacle. These springs act to lift the cover about its pivot axis on the receptacle, whereby it is not necessary to exert as much force on the lifting cable 38.

For lifting the entire receptacle with its cover about its pivot axis on the pin 27, a small windlass is provided. On a longitudinally extending shaft 45 rigidly secured to the lower standard 16, a member 46 is mounted for rotation. Said member includes a grooved pulley 47 and a gear 48. A worm 49 is mounted in a bracket 50 to mesh with the gear 48. A crank 51 on the worm 49 provides means for rotating the member 46.

A rope or cable 52 secured over the grooved pulley 47 and extending over a guide pulley 53 mounted on the upper standard is secured to a lifting structure 54 rigidly mounted on the receptacle. Said structure is formed of angle bars extending upwardly and forwardly from the receptacle when it is in vertical position. The lifting structure is then constructed to provide a comparatively short leverage when the receptacle is lifted through the first part of its movement, and a comparatively long leverage when the receptacle nears its higher position in which substantial power is required for each degree of movement.

In the operation of the device as described, the harvester is operated delivering cotton through the elevator 12 into the cleaner 13. From said cleaner the cotton is delivered into the chute 14 leading to the fan 15. The fan is driven by any conventional drive mechanism, such as indicated in dotted lines in connection with the cleaner construction. From the fan 15, the cotton is carried upwardly through the hollow standard 16 and the hollow standard 19 into the top of the receptacle 24.

When the receptacle 24 is filled, which can be easily determined because of the screen 25, it is lifted to a substantially horizontal position, as shown in Figure 4, by operation of the crank 51. When in lifted position, the receptacle may be swung to either side, as indicated in dotted lines in Figure 2, over a truck or wagon, or a stationary auxiliary receptacle. The latch 32 is then released by pulling the cable 36, and the cover 29 is lifted by pulling the cable 38. The cover 29 is constructed to form a part of the receptacle, in order to facilitate removal of the cotton therefrom. When the cover 29 is lifted, a substantial side portion of the receptacle is also removed, whereby the cotton is free to slide down the lower wall of the receptacle. A rake or other means may be used to facilitate removal of the cotton from the receptacle. After removing the contents of the receptacle, the cover 29 is dropped, whereby it automatically engages the latch 32. As seen in Figure 3, a pair of latches 32 are used, one at either side of the receptacle. The two operating cables are connected together for simultaneous actuation.

Although applicant has shown and described a preferred form of his improved receptacle as utilized on a cotton harvester, it is to be understood that he claims as his invention all modifications of the receptacle and its supporting means coming within the scope of the appended claims, for use on all types of harvesters wherein such a receptacle may find a use.

What is claimed is:

1. In a traveling material collecting machine, a receptacle pivoted on a horizontal axis to the machine and depending downwardly therefrom, means for lifting the receptacle to a substantially horizontal position about its pivot axis, and a cover removably mounted over a portion of the receptacle whereby the contents may be removed by removing said cover.

2. In a traveling material collecting machine, a receptacle pivoted on a horizontal axis to the machine at a height above the height of an auxiliary receptacle and depending downwardly therefrom, means for lifting the receptacle about its pivot axis to a substantially horizontal position whereby it may be extended over an auxiliary receptacle, and a cover removably mounted over the end of the receptacle opposite the pivoted end.

3. In a traveling material collecting machine, a receptacle pivoted on horizontal and vertical axes to the machine and depending downwardly therefrom, means for turning the receptacle about its vertical axis, means for lifting the receptacle to a substantially horizontal position about its pivot axis, and a cover removably mounted over a portion of the receptacle.

4. In a traveling material collecting machine, a receptacle pivoted on a horizontal axis to the machine and extending vertically downwardly therefrom, a cover removably mounted over the lower end of said receptacle, means to lift the receptacle to a substantially horizontal position whereby the contents may be discharged into an auxiliary receptacle.

5. In a traveling material collecting machine, a receptacle mounted on the machine for pivotal movement about a vertical axis, said receptacle being also pivoted on a horizontal axis and extending substantially vertically downwardly therefrom, a cover movably mounted at the lower end of said receptacle, and means to lift the receptacle to a substantially horizontal position whereby it may be extended over and discharged into an auxiliary receptacle.

6. In a traveling material collecting machine, a receptacle pivoted on a horizontal axis to the machine above a normal wagon height and depending downwardly therefrom, means for pivoting said receptacle for movement about a vertical axis with respect to the harvesting machine, means to lift the receptacle to a substantially horizontal position whereby it may be swung over and discharged into a wagon, and a cover removably mounted over the lower end of said receptacle.

7. In a traveling material collecting machine, a receptacle pivoted on a horizontal axis to the machine and suspended downwardly therefrom, the pivot axis being above a normal wagon height, means for pivoting the receptacle for movement about a vertical axis with respect to the machine, means to lift the receptacle to a substantially horizontal position about its pivot axis whereby it may be swung over a receiving wagon, and a cover removably mounted over a portion of the receptacle.

8. In a traveling material collecting machine, a receptacle pivoted on a horizontal axis to the machine and depending downwardly therefrom, means for lifting the receptacle to a substantially horizontal position about its pivot axis, a cover removably mounted over a portion of the receptacle whereby the contents may be removed by removing said cover, and means for delivering collected material from the machine into the receptacle.

9. In a traveling material collecting machine, a receptacle pivoted on a horizontal axis to the machine at a height above the height of an auxiliary receptacle, means for lifting the receptacle above its pivot axis to a substantially horizontal position whereby it may be extended over an auxiliary receptacle, a cover removably mounted over the end of the receptacle opposite the pivoted end, and means for delivering collected material from the machine into the receptacle.

10. In a traveling material collecting machine, a receptacle mounted on the machine for pivotal movement about a vertical axis, said receptacle being also pivoted on a horizontal axis and extending substantially vertically downwardly therefrom, a cover movably mounted at the lower end of said receptacle, means to lift the receptacle to a substantially horizontal position whereby it may be extended over and discharged into an auxiliary receptacle, and means for delivering collected material from the machine into the receptacle.

11. In a traveling material collecting machine, a hollow standard secured to the machine, means for delivering harvested material through said standard, a vertically suspended receptacle pivoted at its upper end on a substantially horizontal axis to said standard, means for discharging material from said standard to said receptacle, and means for lifting the receptacle about its pivot axis to a substantially horizontal position whereby the material therein may be discharged into an auxiliary receiving means.

12. In a traveling material collecting machine, a vertical hollow standard secured to the machine, means for delivering harvested material through said standard, a receptacle pivoted on vertical and horizontal axes with respect to said standard, means for delivering collected material from said standard to said receptacle, and means for lifting the receptacle to a substantially horizontal position for discharging material therefrom.

13. In a traveling material collecting machine, a vertical hollow standard secured to the machine, means for delivering harvested material through said standard, a receptacle pivoted on vertical and horizontal axes with respect to said said standard, means for delivering collected material from said standard to said receptacle, means for lifting the receptacle to a substantially horizontal position for discharging material therefrom, and a cover removably mounted over a portion of said receptacle.

14. In a traveling material collecting machine, a vertical hollow standard secured to the machine, means for delivering collected material through said standard, a hollow upper standard rotatably mounted co-axially with respect to the first-named standard, a suspended receptacle pivotally secured at its upper end adjacent the upper end of the upper standard, an outlet in the upper standard positioned to discharge into said receptacle, means to lift the receptacle to a substantially horizontal position about its pivot axis, and means for discharging material from the receptacle while in lifted position.

15. In a traveling material collecting machine, a vertical hollow standard secured to the machine, a hollow upper standard rotatably mounted co-axially with the first named standard, means for delivering collected material through said standards, a receptacle pivotally secured at its upper end adjacent the upper end of the upper standard and depending vertically downwardly therefrom, an outlet from the upper standard positioned to discharge into the upper end of said receptacle, means to lift said receptacle upwardly to a substantially horizontal position about its pivot axis, and a discharge door on said receptacle.

16. In a traveling material collecting machine, a vertical hollow standard secured to the machine, a fan positioned to discharge into the lower end of said standard, means for delivering the collected material to said fan, a hollow upper standard rotatably mounted co-axially with the first named standard, a receptacle pivotally secured at its upper end adjacent the upper end of the upper standard and depending vertically downwardly therefrom, an outlet from the upper standard positioned to discharge into the upper end of said receptacle, means to lift said receptacle upwardly to a substantially horizontal position about its pivot axis, a discharge door on said receptacle, and means for opening said door operable from the machine.

EDWARD A. JOHNSTON.